(No Model.)

J. M. CARVER.
KITCHEN CABINET.

No. 423,025. Patented Mar. 11, 1890.

Witnesses
H. D. Nealy.
T. W. Fowler.

Inventor
John M. Carver,
By his Attorneys
A. H. Evans & Co

UNITED STATES PATENT OFFICE.

JOHN M. CARVER, OF FAIR FOREST, SOUTH CAROLINA.

KITCHEN-CABINET.

SPECIFICATION forming part of Letters Patent No. 423,025, dated March 11, 1890.

Application filed August 14, 1889. Serial No. 320,688. (No model.)

*To all whom it may concern:*

Be it known that I, JOHN M. CARVER, a citizen of the United States, residing at Fair Forest, in the county of Spartanburg and State of South Carolina, have invented certain new and useful Improvements in Kitchen-Cabinets, of which the following is a full and clear description, reference being had to the accompanying drawings, forming a part of this specification, in which—

Figure 1:
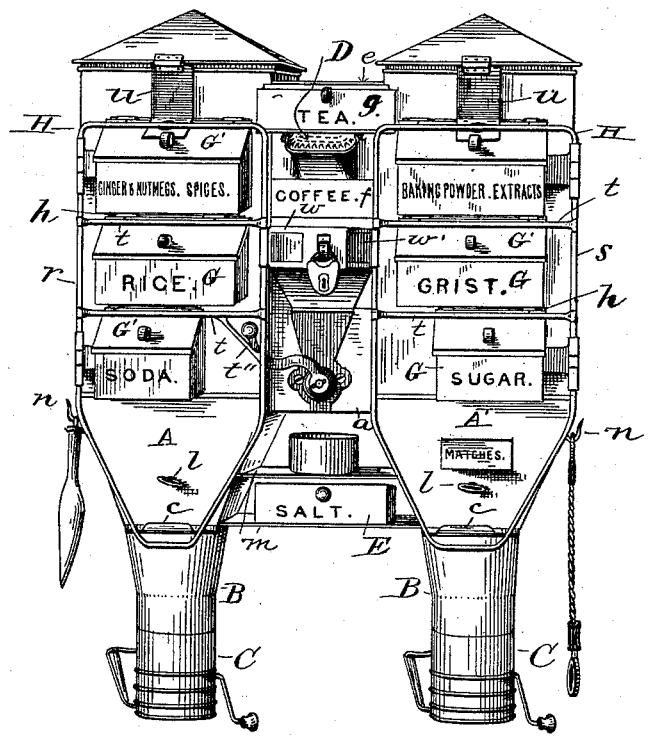
Figure 2:
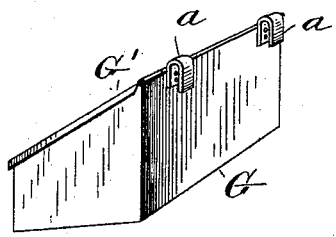

Figure 1 represents a perspective view of a kitchen-cabinet embodying my invention, and showing the several attachments secured therein. Fig. 2 is a detail of one of the receptacles.

My invention relates to certain new and useful improvements in kitchen-cabinets; and it consists in the constructions and combinations of devices which I shall hereinafter fully describe and claim.

To enable others skilled in the art to make and use my invention, I will now describe the same and indicate the manner in which it is carried out.

In the said drawings the cabinet is shown as composed of two bins or receptacles A A', placed side by side and united together by a transverse partition a. The receptacles A A', are designed to contain flour and meal, and their lower ends are contracted and terminate in cylindrical or other discharge spouts B, in each of which is fitted a slide or valve c to regulate the flow of material from the hoppers or receptacles and to shut off the flow when the desired amount has been discharged, a rotary sifter C being fitted to the lower ends of the discharge-spouts, and adapted to thoroughly sift the material as it leaves the hoppers or receptacles.

Between the upper ends of the hoppers A A' is another hopper D, which is divided horizontally into two receptacles e and f, one being designed to hold tea and the other coffee, and to the discharge end of the latter of these receptacles is fitted any well-known form of grinding-mill, which receives and grinds the coffee as it leaves its receptacle, the said mill emptying into a suitable vessel placed beneath it, as shown.

The tea-receptacle may be provided with a drawer g, or it may be otherwise constructed to facilitate the insertion and removal of its contents, and the coffee-receptacle has an opening at D, through which the coffee is introduced. In the lower contracted ends of the hoppers A A' may also be fitted rods l, which serve to agitate the material and prevent it clogging in the discharge-spouts. Two transverse plates or partitions m, located between the lower ends of the hoppers or receptacles, are adapted to receive a drawer or receptacle E, which contains salt, the upper one of these plates m serving also as a support for the vessel which receives the ground coffee from the mill above.

To the front of the hoppers A A' are fitted boxes or receptacles, such as G, which are provided with tongues a, adapted to fit in loops h, secured to the front of the main hoppers, so that the boxes may be removed when desired, and these boxes are adapted to contain such material as soda, sugar, ginger, and nutmegs, baking-powder, and spices, &c., and are each provided with a hinged inclined cover G', as shown.

In addition to the hoppers and receptacles already mentioned, I prefer to likewise secure to the front of the main hoppers A A' suitable boxes or vessels adapted to contain such materials as rice, grist, &c., and these boxes may also be provided with hinged covers to permit free access to the internal contents, and the main hoppers A A' may also be provided with hooks n, upon which may be hung such devices as scoops, egg-beaters, &c.

All the hoppers and boxes previously mentioned, as well as the valves or slides, the tea-drawer, and handle of the grinding-mill may be securely locked, when desired, by a single lock and hinged frame H, which passes over the front of the hoppers, boxes, &c. This frame H is made of light iron rods and is formed in two sections r and s, each having a configuration that closely approximates the shape of the hoppers A A' down to the cylindrical extensions thereof, and being provided with transverse rods t, which are designed to pass over and lie close upon the inclined tops of the hoppers or boxes and thereby securely hold the latter down when the sections of the frame are closed and the cabinet is locked.

The main hoppers A A' have each a hinged top or cover provided with a bent plate or hasp *u* at its front, which is adapted to lie upon the inclined cover of the upper box or receptacle, and to be engaged by the top cross-rods *t* of the sections *r* and *s*, whereby the covers of the main hoppers, the covers of the boxes or receptacles in front thereof, and the tea-drawer are securely held when the sections of the frame H are closed, as shown. The middle and lower cross-rods *t* engage and lock their respective boxes or receptacles in a manner similar to that just described, and the contrasted lower end of the sections *r* and *s* engage the slides or valves in the hoppers A A′ and prevent their being withdrawn, while a short inclined rod *t″* in one of the sections is adapted to engage the handle of the grinding-mill, whereby it is prevented from being turned.

The sections *r* and *s* of the frame H are each hinged at their outer sides to the hoppers or receptacles A A′, and their inner sides are provided with plates *w w′*, one of which carries a staple and the other has a slot therefor, so that when the sections of the frame are closed upon the hoppers, boxes, &c., as shown, they may be securely held in place by a single lock. All of the receptacles may therefore be kept in a secure condition by means of a single lock, which, when released and the sections of the securing-frame opened, also releases the covers of the receptacles, &c., and enables the contents to be removed.

This cabinet is designed to be hung on the wall and over the kitchen-table, and it is so constructed that all pilfering of the contents is avoided.

Having thus described my invention, what I claim as new, and desire to secure by Letters Patent, is—

1. In a kitchen-cabinet, the main hoppers and supplemental hoppers or receptacles fitted to the outer sides thereof, in combination with a frame comprising two hinged sections having cross-bars adapted to pass over the covers of the hoppers when the frame is closed, and means for locking the sections of the frame together, substantially as described.

2. In a kitchen-cabinet, the main hoppers placed side by side, supplemental hoppers hung on the exterior walls thereof, and slides in the discharge ends of the main hoppers, in combination with a frame consisting of two hinged sections, each conforming to the shape of the main hoppers, said sections being hinged at one side to the outer corners of the main hoppers and having cross-bars passing over the covers of the hoppers and across the front edge of the valve, and a lock for securing the inner free ends of said sections, whereby the covers of the main and supplemental hoppers and the valves are held in a locked position, substantially as described.

3. A kitchen-cabinet comprising the two parallel main hoppers and intermediate horizontally-divided hopper, a grinding-mill below the intermediate hopper, supplemental boxes or receptacles removably fitted to the front of said main hoppers, valves in the main hoppers, and a frame consisting of the hinged sections *r* and *s*, having rods which engage the covers of the main and supplemental hoppers, the handle of the grinding-mill, and the valves, and a lock for the meeting sides of the hinged sections, substantially as described.

JOHN M. CARVER.

Witnesses:
C. C. TURNER,
D. T. McCLAIN.